(12) United States Patent
Dron

(10) Patent No.: US 6,948,719 B2
(45) Date of Patent: Sep. 27, 2005

(54) EXTRUDED SEALING SECTION DESIGNED TO BE MOUNTED ON A PROJECTED PART OF A STRUCTURE, PRE-FORM OF SAID SECTION AND PROCEDURE FOR MOUNTING SAID PRE-FORM ONTO THE PROJECTING PART

(75) Inventor: Bernard Dron, Puteaux (FR)

(73) Assignee: Metzeler Automotive Profile Systems Transieres S.A., Nanterre (FR)

( * ) Notice: Subject to any disclaimer, the term of this patent is extended or adjusted under 35 U.S.C. 154(b) by 0 days.

(21) Appl. No.: 10/332,518

(22) PCT Filed: May 10, 2002

(86) PCT No.: PCT/FR02/01584

§ 371 (c)(1),
(2), (4) Date: Feb. 27, 2003

(87) PCT Pub. No.: WO02/090137

PCT Pub. Date: Nov. 14, 2002

(65) Prior Publication Data

US 2003/0209864 A1 Nov. 13, 2003

(30) Foreign Application Priority Data

May 9, 2001 (FR) .......................................... 01 06116

(51) Int. Cl.⁷ .............................................. F16J 15/50
(52) U.S. Cl. ........................ 277/628; 277/906; 277/630
(58) Field of Search .............................. 49/490.1, 498.1; 277/628, 630, 637, 906

(56) References Cited

U.S. PATENT DOCUMENTS

| 2,609,070 A | 9/1952 | Frehse |
| 2,637,880 A | 5/1953 | Beck |
| 3,002,783 A | 10/1961 | Hofmeister |
| 5,449,544 A * | 9/1995 | Ogawa et al. ............... 428/122 |
| 5,840,401 A * | 11/1998 | Baesecke ..................... 428/122 |

FOREIGN PATENT DOCUMENTS

| DE | 841029 | 8/1957 |
| DE | 1 555 062 | 12/1966 |
| EP | 0 754 596 A1 | 1/1997 |
| EP | 1 060 927 A | 6/2000 |
| EP | 1 080 967 A | 8/2000 |
| FR | 2 633 361 A | 6/1988 |

* cited by examiner

Primary Examiner—Enoch Peavey
(74) Attorney, Agent, or Firm—Stephen B. Salai, Esq.; Brian B. Shaw, Esq.; Harter, Secrest & Emery LLP

(57) ABSTRACT

The invention concerns a sealing extruded section designed to be mounted on a projecting part. Said extruded section comprises: two elastomer or plastomer shells (1, 2), including each a wing (1a, 2a) and an adjacent part (1b, 2b) forming a portion of the section base, said two shells being separated from each other by an opening (3) arranged through the section base and extending longitudinally along the median part thereof; a flexible material layer (7) inextensible or hardly extensible, applied inside the two shells (1, 2) so as to secure the two wings (1a, 2a) and the adjacent parts (1b, 2b) to the section base; a wedging shim (4) with cross-section substantially identical to that of the opening (3) separating the shells (1, 2), wherein it is forced in engagement, the cross-section of the opening (3) being such that, when the wedge (4) is fixed, it brings about a tilting movement of said shells relative to each other, thereby bringing closer together the free ends of the two wings of the section.

15 Claims, 3 Drawing Sheets

EXTRUDED SEALING SECTION DESIGNED TO BE MOUNTED ON A PROJECTED PART OF A STRUCTURE, PRE-FORM OF SAID SECTION AND PROCEDURE FOR MOUNTING SAID PRE-FORM ONTO THE PROJECTING PART

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

1. Field of the Invention

This invention relates to an extruded sealing section with a U-shaped transversal section, made of elastomer or plastomer, without a rigid reinforcement such as, notably, a metallic reinforcement. More specifically, it concerns a clamp-forming section of this type, designed to be mounted onto a projecting part of a structure, especially an edge projecting from the frame on an opening in the body of a car, particularly a door frame or trunk frame on such a body.

In addition, the invention involves a blank or pre-form for such a sealing section and a procedure for mounting said blank onto the projecting part of the associated structure in order to create the section and simultaneously make it integral with this part.

The clamp-forming U-shaped sections typically include at least one sealing component adjacent to the base or to a branch of the U shape and projecting toward the outside in such a way that it is compressed between the frame of the opening fitted with this section and the relevant panel, door or lid when the latter is in a closed position, thereby ensuring that this opening is waterproof and soundproof. To ensure that these sections are effectively clamped onto the flange on which they are mounted, they have traditionally included a U-shaped metallic reinforcement at least partially buried in the plastomer or elastomer of which they are made, and, to ensure that the section is not inadvertently disconnected from the associated flange, each wing of the section corresponding to the branches of the U shape usually includes lips or gripping fins that project obliquely in the direction of the other wing from the surface turned toward that wing.

With the same objective, the users of these sections, particularly when the sections have no metallic reinforcement, ensure that they are securely in place by gluing them to the flanges onto which they are fitted, and, for this purpose, they typically use so-called hot-melt glues, which are hard at room temperature but soften when heated. Consequently, users must coat the internal surface of the section base and/or the adjacent parts of the wings with this type of glue on the spot in the presence of heat and then, after the assembly has been heated in order to soften the adhesive and allow it to flow between the section and the flange, they must mount the section to which glue has been applied onto the flange; finally, they must allow the assembly to cool in order to harden the adhesive and thereby secure the section onto the flange.

These steps are relatively simple; nonetheless, users object to the need to heat the adhesive themselves and bemoan the lack of sections that can be mounted directly onto the associated flanges, without having to resort to this tedious operation beforehand.

2. Description of Related Art

From Patent FR 2 633 361 A, we are familiar with a seal made of a flexible extruded material and having a transversal section generally in the shape of a U or a Ω, at the bottom of which is implanted an adhesive substance, such as a mastic. This section is designed to be mounted onto a flange or a projecting edge that penetrates into the adhesive substance, which then hardens naturally, so that the section adheres to the flange or the projecting edge, but this may require a considerable period of time.

To remedy this drawback, it has already been proposed to apply a line of soft glue inside the clamp-forming section that can be hardened by a controlled operation, e.g., heating by means of an electrical conductor buried in the mass of the section or in the line of glue (see EP 1 060 927 A and EP 1 080 967 A, both of which belong to the Applicant). With sections such as these, the projecting part is mounted so as to penetrate the line of soft glue, and this glue is subsequently hardened.

BRIEF SUMMARY OF THE INVENTION

This invention also relates to clamp-forming sections with no metallic reinforcement, but its purpose is to provide sections of this type containing no metallic part and therefore no metallic conductors used to harden a soft glue that hardens when heated.

With this objective in mind, the invention eliminates the use of a soft glue that hardens when heated in such sections and instead is used to secure the section to the projecting part onto which it is meant to be fitted by means of a simple mechanical clamping force around this part.

To this end, the invention's objective is an extruded sealing section with a transversal U- or Ω-shaped section made of elastomer or plastomer, without a rigid reinforcement that is at least partially buried in its mass, said section possibly comprising a sealing element adjacent to its base or to one of its branches and projecting toward the section's exterior, and being designed to be mounted onto a projecting part of a structure, especially the frame for an opening in the body of a car, and being characterized in that it comprises:

two elastomer or plastomer shells or jaws, each comprising a base part aid an adjacent extension part or wing the base part forming a portion of the section base, said two jaws preferably being arranged in more or less symmetrical fashion along a cross-section of the section and separated from each other by an opening made in the section base and extending lengthwise along its median part;

a layer of flexible material that is inextensible or slightly extensible, applied to the interior of the two jaws so as to secure the two wings and the adjacent parts of their respective section base;

a wedging shim, with a cross-section substantially similar to that of the opening separating the jaws, into which it is engaged by force, the cross-section of the opening being such that, when the wedge is fixed in place, it causes these jaws to swing away from each other thanks to the layer of flexible material connecting the two jaws, thereby bringing the free ends of the section's two wings closer together.

The wedging shim and the jaws are advantageously made of the same material and have been extruded.

The layer of flexible inextensible or slightly extensible material connecting the two jaws may have a Shore A hardness of approximately 80 to 90. It may, for example, be made of semi-hard rubber.

In this layer, a sheet or fabric made of an inextensible or slightly extensible material, such as polypropylene, may advantageously be buried, to prevent the risk that this layer will be stretched.

To ensure a perfect seal around the projecting part capped by this section, the latter may advantageously include a layer of mastic applied to the layer of flexible inextensible or slightly extensible material in which the edge of the projecting part can be buried. This mastic may be laterally supported on the lips or gripping fins projecting from the wing of each shell in the direction of the opposite wing.

In addition, this invention involves a blank of this section in which the wedging shim is not engaged in the opening separating the two jaws but may be adjacent to them if, as is preferable, they are jointly extruded. In this case, when the shim is fixed in place in the opening, the extruded links that join the shim and the half-jaws may be broken as a result of the force applied to this shim when it is fixed in place.

Finally, the subject of this invention is a procedure for mounting this section blank onto a projecting part of a structure, notably a frame for an opening in the body of a car, in order to produce the aforementioned section from the blank that we have just defined and to make it integral with this part, said procedure being characterized as follows:

the projecting part is mounted onto the aforementioned blank, with the two jaws arranged on either side of the projecting part and with the opening that separates the two jaws being approximately opposite the projecting part;

and the wedging shim is then driven into the opening so as to swing the free ends of the two jaws toward each other, in order to clamp the projecting part firmly in place.

The wedging shim can be inserted into the opening separating the half-jaws by means of a roller that presses on the shim or a hammer with a vibrating head. During this operation, the wings of the two jaws may themselves also be advantageously pushed toward each other with the help of rotating rollers applied to their external surface, as in so-called roll-forming procedures; this facilitates the insertion of the shim in its housing.

BRIEF DESCRIPTION OF THE SEVERAL VIEWS OF THE DRAWING(S)

The implementation of the invention will be described in greater detail below, with reference to the schematic drawings attached. In these drawings.

DETAILED DESCRIPTION OF THE INVENTION

Figure 1:
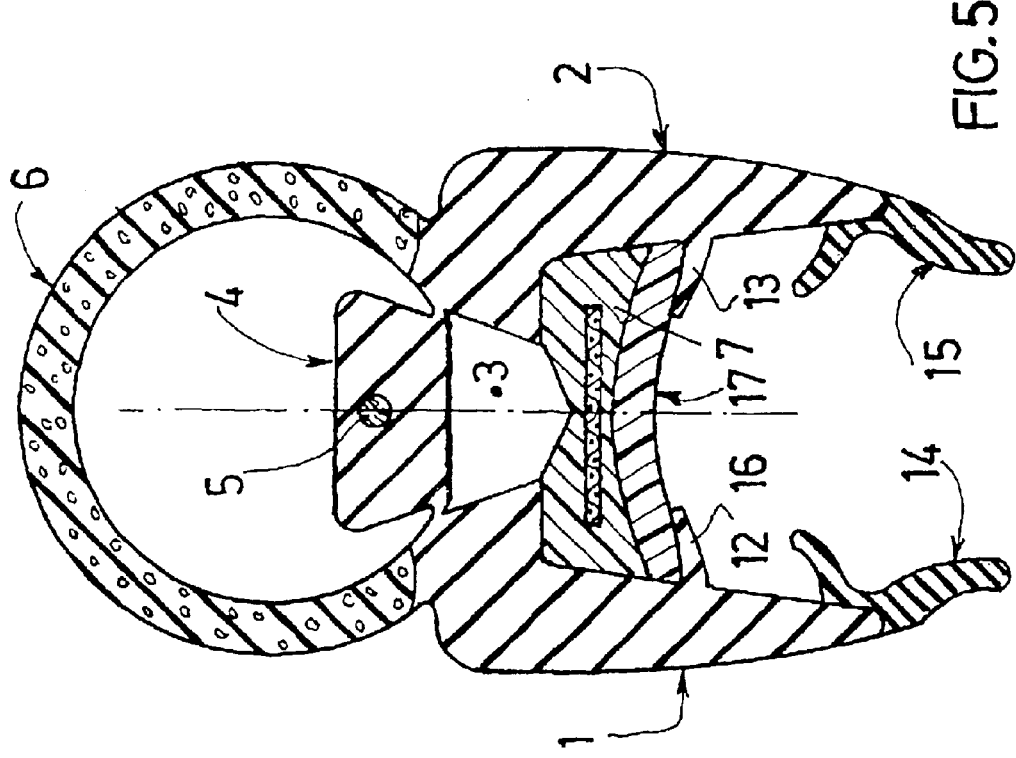
FIG. 1 is a cross-sectional view of an initial blank of the seal in accordance with the invention.

The blank of the frame seal for a car trunk shown in a cross-sectional view in FIG. 1 was produced by co-extrusion. It comprises two jaws 1 and 2 separated by a longitudinal opening 3, in which a shim 4 may be inserted by force to form a wedge having a complementary profile that, in this case, is made of the same material as the jaws 1 and 2 and is laterally connected to the latter by means of extruded links, which in this case are broken when the shim is mounted in place.

The jaws 1 and 2 are arranged symmetrically in a cross-sectional view and, once the shim 4 has been mounted in place, form with the shim a U-shaped section. To this end, each shell comprises a wing, respectively 1a, 2a, corresponding to a branch of the U shape and an adjacent part, respectively 1b, 2b, that forms a part of the U-shaped base adjacent to the shim 4. The opening 3 and the shim 4 are arranged longitudinally in the median part of the section.

In customary fashion, the shim 4 contains a fiberglass wire 5, while a tubular sealing section 6, made for example of foam rubber, is adjacent to the parts 1a and 2a of the jaws 1 and 2, with which it was jointly extruded.

According to the invention, a layer 7 of an inextensible or slightly extensible material, such as semi-hard rubber, connects the wings 1a and 2a of the jaws 1 and 2 and is applied to the parts 1b and 2b, of which it forms an integral part, transversally to the opening 3. This opening 3 and the wedging shim 4 have a section—in this case, a section in the form of an isosceles trapezoid, whose small base lies at the entrance of the opening 3—such that when the shim 4 is forced into the opening 3 by spreading parts 1b and 2b apart, the wings 1a and 2a are made to swing away from each other, since they are connected by the inextensible material; as a result, the free ends of these wings are brought closer together in order to clamp firmly in place a flange 8 on which the section rests, as can be seen in FIG. 2.

Figure 2:
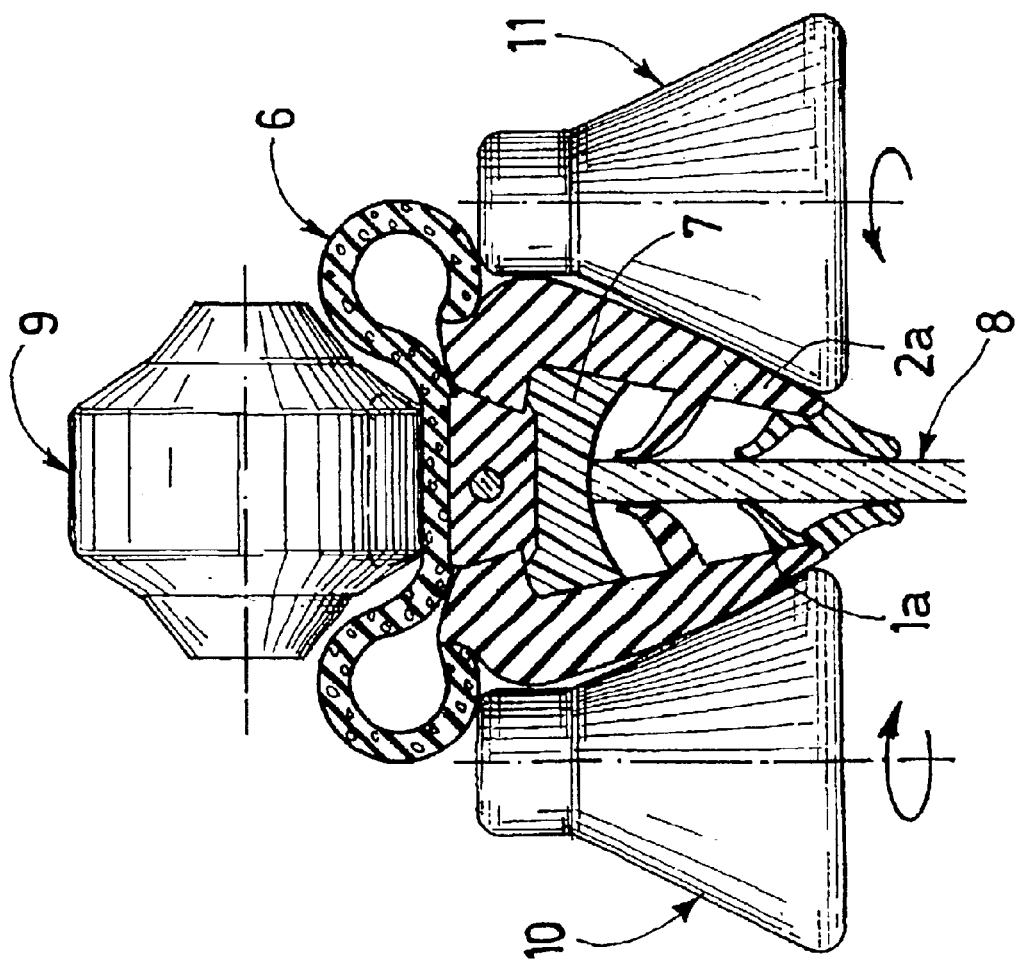
FIG. 2 illustrates the creation of a seal in accordance with the invention based on the blank in FIG. 1 and its simultaneous mounting on a projecting part of a frame for an opening in the car trunk.

As shown in FIG. 2, the shim 4 may be inserted by means of a roller 9 that may or may not be made to rotate, while the wings 1a and 2a of the jaws 1 and 2 are simultaneously pushed towards each other by the rollers 10 and 11, also rotating, which press against their lateral surface and facilitate the insertion of the shim 4. The roller 9 may advantageously be activated by an alternating movement perpendicular to the shim.

The gripping fins 12, 13, 14, 15 that protrude from the parts 1a and 2a in the direction of the opposite part are in this way pressed against the flange 8 to ensure that the resulting section does not become detached from the flange 8. It should be noted that the gripping fins 14 and 15, arranged, for example, along the free edge of the parts 1a and 2a, are double gripping fins with a section in the shape of a circumflex accent, thereby ensuring better adherence to the flange 8.

This section is thus held in position on the flange 8 by means of a simple mechanical effect, without the use of a soft glue that would be hardened by passing an electric current through the metallic wires arranged in this glue or in the adjacent parts of the section.

There may be a gap between the edge of the flange 8 and the layer 7 of inextensible material, or the two may come substantially in contact.

It should be observed that the wedging shim 4 includes, along the edges of its end that is closest to the layer 7, projecting parts that snap into place below the parts 1b and 2b in order to lock the shim into position in its housing.

Figure 3:
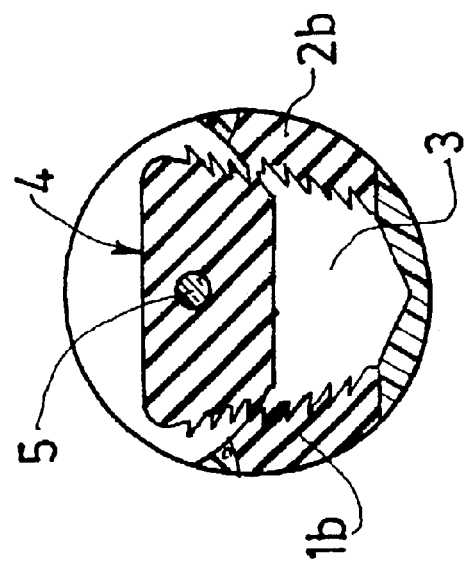
FIG. 3 is a detailed view of a variant of FIG. 1.

As can be seen in FIG. 3, the lateral edges of the shim 4 and the adjacent surfaces of the opening 3 may also include grooves to ensure that the shim does not accidentally escape from its housing.

Figure 4:
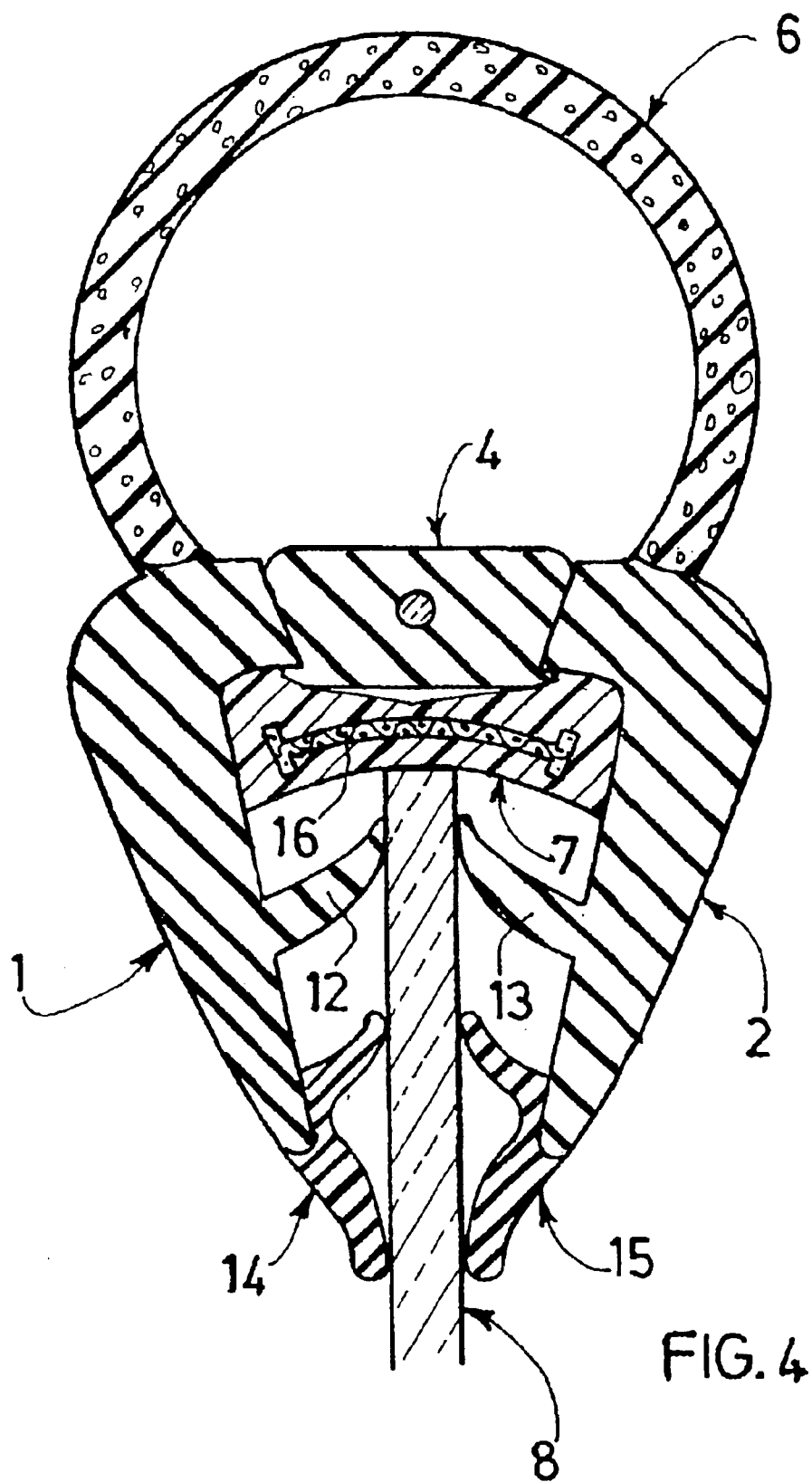
FIG. 4 is a cross-sectional view of another method of producing the seal in accordance with the invention, positioned on a projecting part of a frame for an opening in the car trunk.

FIG. 4, in which the previously described components are designated by the same reference numbers, represents another method of producing the seal in accordance with the invention, which differs from that of FIG. 1 only in that a strip of a sheet or fabric made of an inextensible material, such as polypropylene, is incorporated into the slightly extensible or inextensible material of the layer 7 so as to further reduce the risk of stretching this layer 7.

Figure 5:
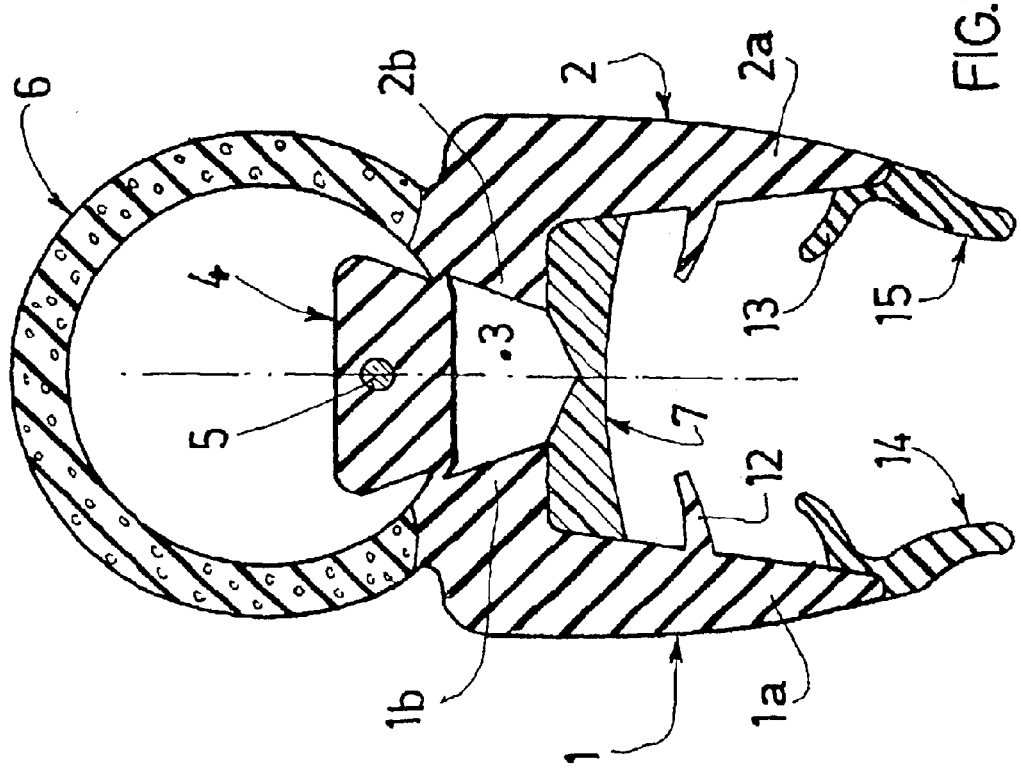
FIG. 5 is a view analogous to FIG. 1 of another blank of a seal in accordance with the invention.

FIG. 5, in which the previously described components are designated by the same reference figures, represents another method of producing the invention, in which a layer of soft mastic 17, in this case supported laterally by the wings 12 and 13, is applied to the layer 7 of inextensible material. The flange that is designed to be mounted on the section penetrates this layer of mastic, thereby providing a perfect seal between this flange and the section.

All of the aforementioned methods of producing the invention involve a seal for a car trunk, but clearly the invention can also be applied to seals on the frame of a car door, in which case the sealing component would be laterally adjacent to one of the section's jaws.

The sections in accordance with the invention do not have any metallic parts and are thus less costly than those formerly used that included a reinforcement. They are also lighter than the latter and thus easier to use.

What is claimed is:

1. An extruded sealing section with a U- or Ω-shaped transversal section, made of elastomer or plastomer, without a rigid reinforcement buried partially in its mass, and being designed to be mounted on a projecting part of a structure, especially a frame for an opening in the body of a car, by means of a tight clamp, comprising:
    two elastomer or plastomer jaws, each comprising a wing and an adjacent part forming a portion of the section base, said two jaws preferably being arranged in more or less symmetrical fashion along a cross-section of the section and separated from each other by an opening made through the section base and extending lengthwise along its median part;
    a layer of a flexible material that is inextensible or slightly extensible, applied to the interior of the two jaws so as to secure the two wings and the adjacent parts to their respective section base;
    a wedging shim with a cross-section substantially similar to that of the opening separating the jaws, into which it is engaged by force, the cross-section of the opening being such that when the wedge is fixed in place, it causes these jaws to swing away from each other thanks to the layer of flexible material connecting the two jaws, thereby bringing the free ends of the section's two wings closer together;
    and a sheet or a fabric made of an inextensible material buried in the layer of material that is inextensible or slightly extensible.

2. An extruded sealing section with a U- or Ω-shaped transversal section, made of elastomer or plastomer, without a rigid reinforcement buried partially in its mass, and being designed to be mounted on a projecting part of a structure, especially a frame for an opening in the body of a car, by means of a tight clamp, comprising:
    two elastomer or plastomer jaws, each comprising a wing and an adjacent part forming a portion of the section base, said two jaws preferably being arranged in more or less symmetrical fashion along a cross-section of the section and separated from each other by an opening made through the section base and extending lengthwise along its median part;
    a layer of a flexible material that is inextensible or slightly extensible, applied to the interior of the two jaws so as to secure the two wings and the adjacent parts to their respective section base;
    a wedging shim with a cross-section substantially similar to that of the opening separating the jaws, into which it is engaged by force, the cross-section of the opening being such that when the wedge is fixed in place, it causes these jaws to swing away from each other thanks to the layer of flexible material connecting the two jaws, thereby bringing the free ends of the section's two wings closer together; and
    a layer of soft mastic applied to the layer made of inextensible material between the wings of the jaws.

3. A procedure for mounting a section pre-form onto a projecting part of a structure, in order simultaneously to produce the corresponding section and make it integral with this projecting part, said procedure being characterized in that:
    mounting the pre-form on the projecting part, with the two jaws arranged on either side of the projecting part and with the opening that separates the two Jaws being approximately opposite the projecting part;
    driving the wedging shim into the opening by means of a rotating roller or a vibrating hammer so as to swing the free ends of the two jaws toward each other in order to clamp the projecting part firmly in place.

4. A procedure according to claim 3, in which the wings of the jaws are simultaneously pushed laterally towards each other by the rotating rollers.

5. An extruded sealing section for a vehicle comprising:
    first and second opposed jaws, each having a base part and an extension;
    at least one gripping fin on at least one of the extensions;
    a flexible hinge comprising a no more than slightly extensible material connected between the base part of one jaw and the base part of the other jaw, the hinge holding the jaws together so that an opening is formed between the base parts;
    a wedging shim disposed in the opening cooperating with the hinge to urge the extensions of the jaws together; and
    a sheet or a fabric made of an inextensible material buried in the layer of material that is inextensible or slightly extensible.

6. An extruded sealing section for a vehicle comprising:
    first and second opposed jaws, each having a base part and an extension;
    at least one gripping fin on at least one of the extensions;
    a flexible hinge comprising a no more than slightly extensible material connected between the base part of one jaw and the base part of the other jaw, the hinge holding the jaws together so that an opening is formed between the base parts;
    a wedging shim disposed in the opening cooperating with the hinge to urge the extensions of the jaws together; and
    a sheet or a fabric made of an inextensible material buried in the layer of material that is inextensible or slightly extensible.

7. An extruded sealing section for a vehicle comprising:
first and second opposed jaws, each having a base part and an extension;
at least one gripping fin on at least one of the extensions;
a flexible hinge comprising a no more than slightly extensible material connected between the base part of one jaw and the base part of the other jaw, the hinge holding the jaws together so that an opening is formed between the base parts;
a wedging shim disposed in the opening cooperating with the hinge to urge the extensions of the jaws together; and
a layer of soft mastic applied to the layer made of inextensible material between the wings of the jaws.

8. An extruded sealing section for a vehicle comprising:
first and second opposed jaws, each having a base part and an extension;
at least one gripping fin on at least one of the extensions;
a flexible hinge comprising a no more than slightly extensible material connected between the base part of one jaw and the base part of the other jaw, the hinge holding the jaws together so that an opening is formed between the base parts;
a wedging shim disposed in the opening cooperating with the hinge to urge the extensions of the jaws together; and
a layer of soft mastic applied to the layer made of inextensible material between the wings of the jaws.

9. A section according to claim 5, characterized in that a layer of soft mastic is applied to the layer made of inextensible material between the wings of the jaws.

10. A pre-form of a section according to claim 5, characterized in that the wedging shim is not engaged in the opening separating the two jaws, but is adjacent to the opening.

11. A pre-form of a section according to claim 6, characterized in that the wedging shim is not engaged in the opening separating the two jaws, but is adjacent to the opening.

12. A sealing section for mounting on a projecting part of a frame for an opening comprising:

first and second jaws each jaw comprising a gripping part and a base part, the first and second jaws being arranged parallel to each other;

a layer of flexible material that is inextensible or slightly extensible connected to each jaw at a location between the gripping part and the base part so that each jaw pivots with respect to the layer of material so that as the base parts are moved apart the gripping parts are moved together and vice versa; and a wedging shim connected between the base parts of the two jaws and urging the base parts together so as to urge the gripping parts apart, and movable along a line substantially bisecting the two jaws into a position urging the base parts apart so as to urge the gripping parts of the jaws together.

13. The sealing section of claim 12 comprising an extra eight sealing section made of elastomer or plastomer.

14. The sealing section of claim 12 in which the wedging shim and the jaws are co-extruded.

15. The sealing section of claim 12 in which the wedging shim is not engaged in the opening separating the two jaws, but is adjacent to the opening rate.

* * * * *